July 12, 1949.　　　　K. SCHLESINGER　　　　2,475,991
DISCRIMINATOR CIRCUITS

Filed Sept. 21, 1944　　　　　　　　　　　　2 Sheets-Sheet 1

INVENTOR
KURT SCHLESINGER.
BY H. S. Groves
ATTORNEY

July 12, 1949.  K. SCHLESINGER  2,475,991
DISCRIMINATOR CIRCUITS
Filed Sept. 21, 1944  2 Sheets-Sheet 2

INVENTOR
KURT SCHLESINGER.
BY
ATTORNEY

Patented July 12, 1949

2,475,991

UNITED STATES PATENT OFFICE 2,475,991

DISCRIMINATOR CIRCUITS

Kurt Schlesinger, West Lafayette, Ind., assignor to Radio Corporation of America, a corporation of Delaware Application September 21, 1944, Serial No. 555,106

11 Claims. (Cl. 250—27)

This invention relates to frequency modulation systems, and particularly to a frequency modulation detector for use therein.

According to the present invention, use is made of a cathode follower type of tube and circuit connection whereby the desired effects are achieved for obtaining discriminator action in a frequency modulation system. In the past, cathode follower circuits have been used primarily as coupling elements wherever high input and low output impedances were required, as would be the case, for example, in matching stages at the input of a coaxial cable; or, for instance, as coupling tubes in wide band amplifiers, as already explained in my Patent No. 2,384,263 dated September 4, 1945, entitled "Video amplifier." In such applications the cathode follower tube functions as a "repeater," and it is customary to consider the cathode load as an ohmic resistance without phase rotations within the frequency range utilized in the operation.

In the present invention the cathode load is not an ohmic resistor, but rather a series tuned circuit. As a result the cathode voltage is, generally speaking, substantially out of phase with respect to the input. Actually it is in phase with it for resonance only, but there the cathode voltage is zero for low-loss circuits. It has been found that this phase rotation of the cathode voltage of a tuned cathode follower may be made use of to develop an efficient detector for frequency modulated signals. To this end it is necessary to provide for two radio frequency rectifiers, around the cathode, to obtain from the cathode voltage two direct currents. It was found, furthermore, that under certain circumstances these direct currents may be combined in differential arrangement after flowing through a common load resistor. As a result there is obtained a direct current output voltage, which is strictly proportional to the deviations of input frequency from a center frequency for which the output is zero.

Thus, according to the present invention, there is provided a circuit which includes, broadly speaking, a cathode follower stage with a tuned cathode circuit which is connected, in turn, to two diodes so that its output is rectified through appropriately arranged rectifiers connected in differential arrangement. Two equal and opposite exciter voltages may be induced in series with the rectifiers by way of an aperiodic radio frequency transformer connection from the plate of the cathode follower tube to the rectifiers by an appropriate choice of connection of the final load resistor output. The resultant low frequency voltage variations which appear across the resistive output may be caused to vary linearly from a zero value at cathode resonance to positive or negative values for frequency deviation, and to be strictly proportional to the frequency excursions of the incoming frequency both below and above the chosen resonant frequency.

The aims and objects of this invention, later to be outlined and set forth, may generally be obtained through the use of a single tube having included therein a triode portion and a diode portion to which connections are made to appropriately arranged external circuits of the general character above outlined, or in the alternative, a combination of separate triode and diode tubes and appropriately arranged external circuits may be relied upon for the purposes of carrying out the aims and objects of this invention.

Accordingly, it is an object of this invention to provide a circuit comprising a tuned cathode follower in combination with diode rectifiers which exhibit relatively high selectivity, and which is, therefore, usable as a frequency discriminator.

A further object of this invention is to provide a frequency discriminator circuit utilizing conventional tube types cooperatively arranged with relatively simple external circuits.

A further object of the invention is to provide a grid-controlled frequency modulation detector circuit which will have almost no load across the input circuit so that greater overall gain may be achieved while, at the same time, providing a circuit which will have no reversing characteristics so that there is only one definite tuning point for it.

A further object of the invention is that of providing a discriminator which will have a low impedance output circuit, and is, therefore, capable of high fidelity while, at the same time, having a very low hum level in that the cathode follower filter circuit, generally speaking, provides for hum elimination.

Still a further object of the invention is to provide a cathode follower type of frequency discriminator which will make possible the provision of a circuit having low output impedance so that the reproduction of very high audio frequencies becomes possible.

Other objects and advantages of the invention are those of providing a form of frequency modulation detector circuit which overcomes one or more difficulties found to exist in prior are arrangements, as well as to provide a system of the aforesaid character which is relatively simple in its arrangement and construction and yet which is extremely efficient and reliable in its operation.

Other objects and advantages of the invention will at once suggest themselves and become apparent to those skilled in the art to which the invention is directed from the following description and read in connection with the accompanying drawings, wherein.

Figure 1:
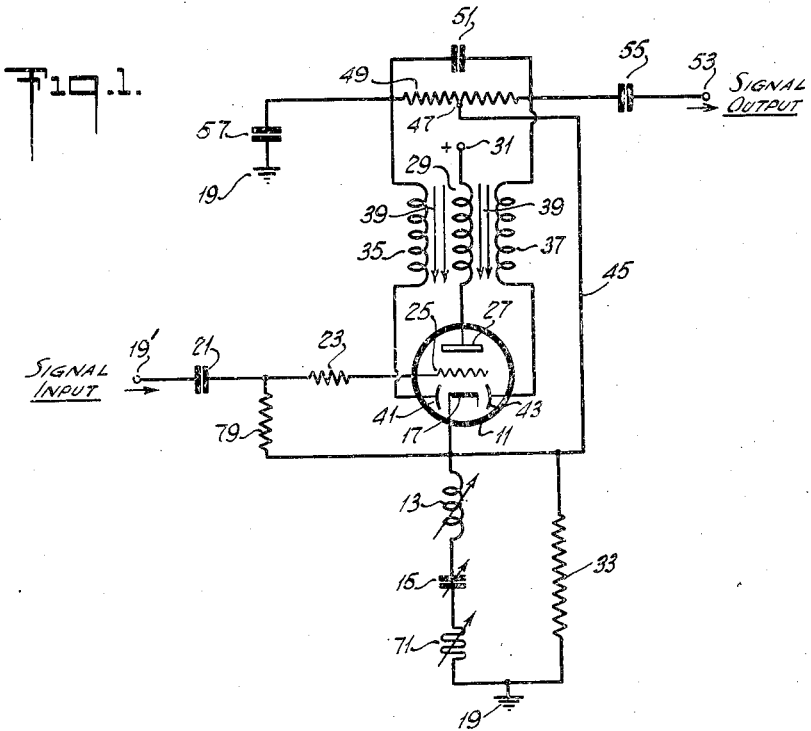
Fig. 1 illustrates diagrammatically one suitable form of circuit connection for practicing the invention.

Referring now to the drawings for a further understanding of this invention and, first, to Fig. 1 thereof, it will be observed that essentially the circuit comprises a complex cathode follower including tube 11 having a tuned load circuit provided in the form of the serially connected inductance 13 and capacity 15 which are connected between tube cathode 17 and a point of fixed potential, such as ground 19. When signals are supplied to a circuit of this character, these signals are preferably introduced as frequency modulation signals appearing at the input terminal 19'. These signals are supplied usually from a limiter, of generally known character, through the coupling condenser 21. The decoupling resistor 23 is provided in order to eliminate the influence of the variable input resistance from the cathode follower back into the driver circuit. The input signals are thus applied to the input grid or control electrode 25 of the tube 11 whose plate or anode element 27 connects through the primary winding 29 of a radio frequency transformer to a terminal point 31, where the positive voltage is applied from a voltage source (not shown) having its positive terminal connected, for instance, at 31 and its negative terminal connected, for instance, to ground 19. The cathode circuit of the tube 11 includes the high impedance feeder resistor 33 which is shunted by the previously described series resonant circuit comprising the inductance 13 and the capacity 15, either or both of which may be made adjustable for the purpose of tuning.

The series circuit comprising the inductance 13 and the capacity 15 which connects between the cathode 17 of tube 11 and ground 19 is tuned to the center frequency of the frequency band to be received, and thus tends to become, at the center frequency, substantially a very small resistance.

In the plate circuit of the tube 11, the transformer winding 29 forms the primary winding of what is essentially an aperiodic radio frequency transformer having three coils consisting of the primary 29 and secondary coils 35 and 37 with the indicated tuning being provided by means of adjustable iron powder cores 39 of any desired and well-known form.

This transformer will produce equal and opposite output voltages in the secondary windings 35 and 37, and leave these voltages ±90° out of phase with the plate current, provided that the coupling is tight (such as that provided by the iron cores 39) and resonance occurs outside and above the band. Equality of the two outputs may be secured by a displacement of the iron core.

The two secondary windings 35 and 37 of the plate or anode transformer are reversely connected to supply balanced exciter voltages to the diode sections of the tube 11, which diode sections comprise the anode elements 41 and 43 functioning in cooperative relationship with the common tube cathode element 17. These connections thus provide exciter voltages on the diodes in ±90° phase rotation with respect to the current flow through the triode section of the tube 11. The direct current output from the diode elements is then fed by way of the conductor 45 into the center tap connection 47 of the output resistor 49. This output resistor is preferably of relatively high value, although lower than normal in conventional FM (frequency modulation) detectors and may be of the order of 50,000 ohms, for instance, and it is preferably bridged by a capacitor 51 which serves as a radio frequency shunt. Output voltages within the audio frequency range, for instance, are derived at the output terminal 53 connected to one end of the load resistor 49 by way of the coupling condenser 55. The other end of the load resistor is grounded by way of the relatively large condenser 57 for both radio frequency and audio frequency.

In the operation of a circuit of this character the audio output voltage appearing across the load resistor 49 is found to be of zero value at cathode resonance (that is, at center frequency), and to be strictly proportional to the frequency excursions below and above that frequency. Accordingly, if the frequency of the signals applied at the input terminal 19' varies one way or the other from the selected center frequency, it may be shown that the circuit comprising the inductance 13 and the capacity 15 which is resonant at the center frequency becomes predominantly capacitive or inductive so that with decreases in frequency, for instance, the series resonance circuit tends to become a capacitive type of load, while on frequency excursion to the other side of the center frequency the load tends to become inductive. The desired form of frequency discrimination curve then comes about by unbalance between the voltages derived from diodes 41, 17 and 43, 17 respectively, the difference of which is responsible for the resulting audio voltage across resistor 49. The difference is strictly proportional to the frequency deviation, as an analysis proves. In the frequency range selected the circuit serves as a detector of impressed frequency modulated signal energy. This occurs because the secondary windings 35 and 37 of the transformer are connected in push-pull relation to provide the desired feedback energy to the respective diodes so that each diode develops a direct current voltage between its corresponding terminal of the output resistor 49 and the center tap 47 thereon. It thus can be shown that each direct current voltage output contribution is equal to the peak value of the respective radio frequency potential existing at each diode anode and cathode which, in turn, depends upon the frequency deviation. Further, the circuit hereinabove disclosed is so constructed that it is capable of providing an output of twice the input radio frequency amplitude with that output being zero at the center frequency and perfectly linear over wide frequency deviations around center frequency.

In this circuit the resistor 71 may be variable and of a maximum value of the order of 500 ohms. The function of resistor 71 is that of socalled band width spreading. In this use it might be pointed out that if the tube 11 has a slope or transconductance of 10 milliamperes per volt, the band width or selectivity of the system is approximately 300 kilocycles (kc.) with no resistor 71. Upon including the resistor 71 in the circuit, the overall characteristic of the detector becomes less steep; and when the resistor 71 has a value of the order of 500 ohms, the range may approach 1 megacycle (mc.), or ±500 kc., to fully modulate the same detector. This system thus becomes particularly useful in cases where narrow and wide frequency modulation swings are to be handled by one receiver which is obtainable through a variance of the resistor value.

Figure 2:
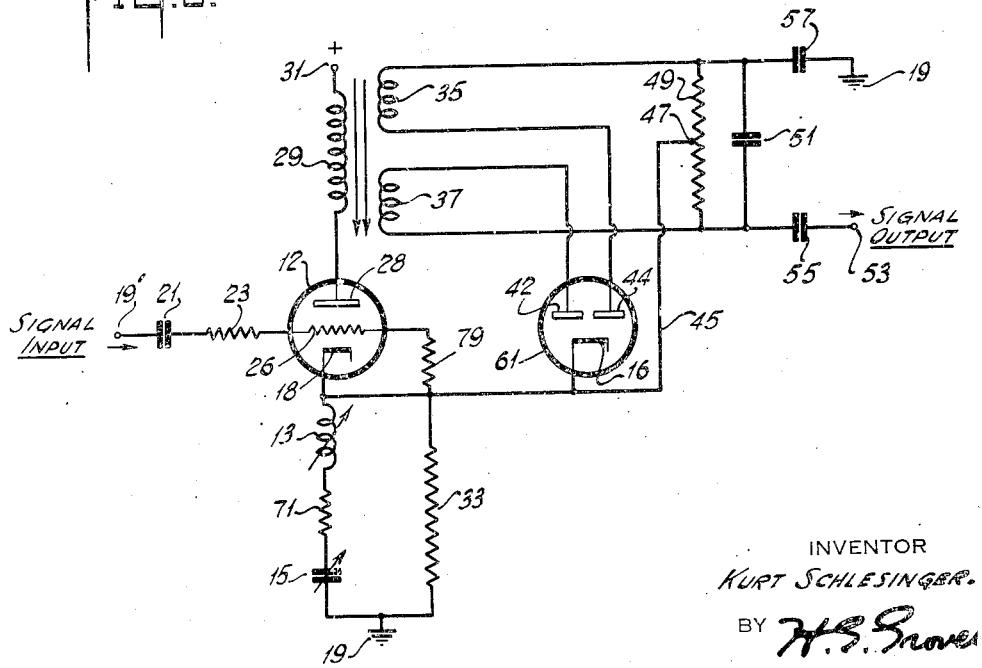
Fig. 2 illustrates a modification of the arrangement of Fig. 1, making use of essentially the same circuit combination with separate cathode follower and rectifier tubes; and, Fig. 3 and 4 illustrate general circuit modifications of the arrangements shown by Figs. 1 and 2.

The modified form of circuit shown in Fig. 2 utilizes components which are essentially the same as those disclosed in the arrangement of Fig. 1, with the exception of the substitution for the triode section of tube 11 of a separate triode tube 12 with high transconductance having cathode, grid and anode elements 18, 26, and 28, corresponding respectively to the cathode, grid and anode elements 17, 25 and 27 of Fig. 1. Further, the diode sections of the tube 11 are replaced in Fig. 2 by a separate tube 61 having a cathode element 16 and separate anode elements 42 and 44.

In these considerations, it can be shown that the selectivity of the detector is proportional to the mutual transconductance of the triode used. For instance, with the more conventional types of triodes which have a transconductance of the order of 3 milliamperes per volt, 750 kc. are required to fully modulate the output. In many cases this frequency range is too great, and it is desirable to have the circuit react on a smaller value of frequency deviation. This would require triodes with a higher transconductance or a higher slope. Tubes having these qualities are available commercially and are known as tubes of the type 6AC7 or 6J4, for instance, with slopes up to 10 or even 12 milliamperes per volt. With tubes of this type the same circuit will yield a selectivity of 300 kc. or even 200 kc. respectively. However, as far as is known, triodes of this character are not now commercially available in the form combined with the double diode. Accordingly, the circuit of Fig. 2 makes use of a separate diode tube 61 in connection with a triode having exceptionally high mutual conductance, as represented by the tube 12. In this connection, the resistor 71 connected between the cathode 18 and ground 19 is of relatively small value, usually being of the order of 100 to 300 ohms, and it is used for the purpose of counteracting the beneficial effect of the high slope of the triode so that the selectivity decreases and the band width may be increased at will from about 200 kc. with a resistor of substantially zero value to any desired larger value.

The circuit arrangements are essentially duplicates of those shown and described in the arrangement of Fig. 1, as above explained, and further reference to this circuit need not be made since the operation is essentially like that of Fig. 1.

Figure 3:
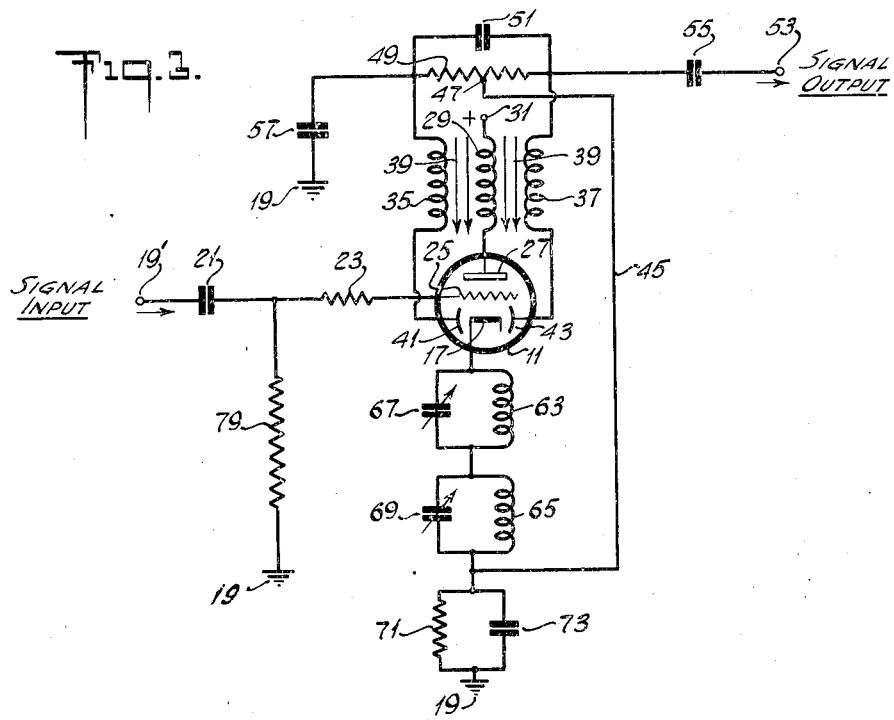

The arrangement of Fig. 3 is essentially a modification of that disclosed in Fig. 1 with two parallel resonant circuits being connected in series, and both being connected between the cathode 17 of the tube 11 and ground 19. In this arrangement, the inductance elements 63 and 65 connected in parallel with the capacity elements 67 and 69 respectively are each of slightly different inductance value, and each is tuned by a trimmer condenser.

Thus, there are provided two resonant circuits which are tuned to a frequency slightly above and slightly below the center frequency respectively.

There is negligible mutual inductance existing between the two coils 63 and 65. The mutual inductance between coils 63 and 65 may be further reduced, if desired, by shielding. These two parallel resonant circuits, which are serially connected between the cathode 17 and ground 19, connect to ground through the resistive element 71 and the shunting condenser 73. The resistive element 71 produces a bias for the grid 25.

The complications of the use of two tuned cathode circuits instead of one, as in the preceding arrangements, are justified by the benefit that in the frequency region between the two individual resonance points of the circuit 63, 67 on the one hand, and 65, 69 on the other hand, the cathode resonance goes through zero at a much faster rate, and changes from inductive to capacitive characteristics much more rapidly than with the simpler form of inductance-capacitive circuit shown in Fig. 1. Thus, with the arrangement of Fig. 3, it becomes possible to obtain good selectivity even when using tubes of only moderate slope. The result is that the presently commercially available types of diode-triode tubes can be utilized efficiently so that tubes of the types known as the 6Q7 and the 6R7, which have only a reasonably high slope of the order of about 2 milliamperes per volt, can be relied upon for use as the tube 11. This makes it possible for the circuit herein disclosed to be used with higher slope types of triodes and separate diodes (as shown by Fig. 2) and a relatively simple cathode circuit or a single tube (as in Fig. 3) but a more complex cathode system.

Figure 4:
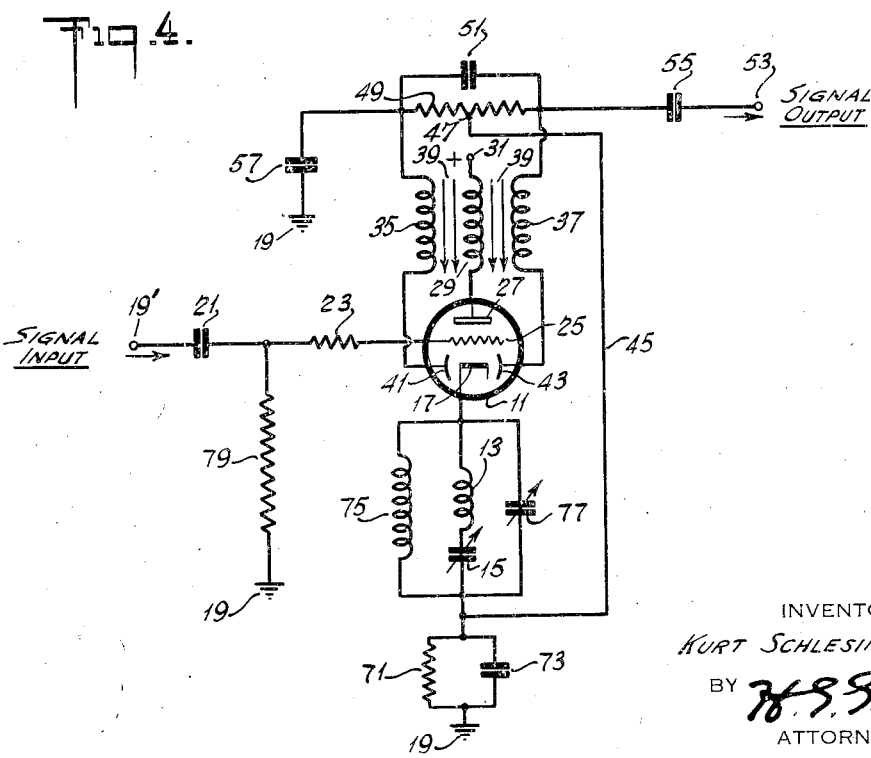

A still further modification of the circuit is provided in the arrangement of Fig. 4 where the series resonant circuit comprising the inductance element 13 and the serially connected capacity 15, each connect to ground 19 through the bias resistor 71 and its shunting capacity 73. Connected in parallel with the series resonant portion of the circuit there is provided both a shunting inductance element 75 and a shunting capacity element 77.

In this arrangement the network comprising the elements 75, 13, 15, and 77 is electrically equivalent to the arrangement provided by the two circuits 63, 67 and 65, 69 of Fig. 3. Accordingly, the system may be designed in such a way as to have the same resonance points and the same reactance characteristics as the circuit of Fig. 3.

Further, in the arrangements disclosed, the circuit may be utilized as a self-biasing element. For instance, with the circuit of Fig. 1, the grid leak resistance 79 provides self-bias through grid current, and this will increase with increases in signal amplitude. At very strong outputs, the plate current will appear to be limited by the grid current and plate voltage cutoff action so that a substantially rectangular clipped plate current wave results, and the amplitude wave will not further increase as the signal input increases. The result thus obtained is that all voltages are limited and the cathode swing does not further increase, nor do the exciter voltages, nor do the diode currents. Therefore, the output voltage does not increase with signal amplitude above a certain point. The device then becomes one of the type which responds only to variations in the input frequency, which is a desirable operation of a self-limiting FM detector.

In connection with the showing and description hereinabove set forth, it should be understood that many and various tube types and circuit constants may be utilized. However, for purposes of reference, it might be remarked that there may be used tubes of the type of tube II shown by each of Figs. 1, 3 and 4, and may generally be of types known as the 6R7 or the 6Q7, with the former usually being slightly more desirable because of its higher transconductance due to the higher plate current, and the fact that the amplification factor is slightly small is immaterial in that audio frequency amplification is primarily not of the essence of the invention.

From the foregoing description, it will be apparent that many and various forms of circuits and modifications thereof may be used without departing from the spirit and scope of what has herein been set forth, and explained and I, therefore, believe myself to be entitled to make and use all such modifications as fall fairly within the spirit and scope of what is hereinafter claimed as new.

What I claim is:

1. A frequency modulation discriminator circuit including a thermionic amplifier tube having input and output electrodes, said output electrodes including a cathode, an input circuit connected to said input electrodes to supply frequency modulated signal input upon the tube, a tuned circuit connected to the cathode and included in said input circuit and tuned to the center frequency of the frequency range of the frequency modulated signals applied upon the input circuit, a radio frequency transformer having its primary winding connected to the output electrodes, said transformer having tightly coupled secondary and tertiary windings to receive voltages from the said primary winding, said transformer having its natural frequency outside and above the spectrum of the received frequency modulated signal input, a load resistor in circuit with said secondary and tertiary windings and said cathode for supplying output signals to a load circuit, a pair of diode rectifiers connected to rectify the alternating current voltage from the said thermionic tube, a separate circuit including each of said secondary and tertiary windings and a respective diode rectifier thereby to excite the anode elements of the diodes by equal and opposite voltages in phase and in phase opposition to the cathode voltage available at the said tuned circuit, and means to supply the direct current output from the rectifiers in differential manner to the said load resistor.

2. A frequency modulation discriminator circuit including a thermionic amplifier tube having at least a cathode, a control electrode and an output electrode, an input circuit connected to said control electrode, means to supply frequency modulated signal input upon the control electrode input circuit of the said tube, a tuned circuit connected to the cathode and included in said input circuit and tuned to the center frequency of the frequency range of the frequency modulated signals applied upon the input circuit, a radio frequency transformer having its primary winding connected to the amplifier output electrode, said transformer having tightly coupled secondary and tertiary windings to receive voltages from the said primary winding, said transformer having its natural frequency outside and above the spectrum of the received frequency modulated signal input, a load resistor having its terminals connected to one end terminal of the secondary and tertiary transformer windings for supplying output signals to a load circuit, a pair of diode rectifiers connected to rectify the alternating current voltage from the said thermionic tube, connections between the other secondary and tertiary winding terminals and the diode anodes to excite the anode elements of the diodes by equal and opposite voltages in phase and in phase opposition to the said cathode voltage available at the said tuned circuit, and a connection common to the space current paths of the diode rectifiers and the load resistor mid-point to supply the direct current output from the rectifiers in differential manner to the said load resistor.

3. A frequency modulation discriminator circuit including a thermionic amplifier tube having at least a cathode, a control electrode and an output electrode, means to supply frequency modulated signal input upon the control electrode input circuit of the said tube, a tuned circuit comprising a series resonant circuit shunted by parallelly connected inductance and capacity elements, said tuned circuit being connected to the cathode and tuned to the center frequency of the frequency range of the frequency modulated signals applied upon the input circuit, a radio frequency transformer having its primary winding connected to the amplifier output electrode, said transformer having tightly coupled secondary and tertiary windings to receive voltages from the said primary winding, said transformer having its natural frequency outside and above the spectrum of the received frequency modulated signal input, a load resistor having its terminals connected to one end terminal of the secondary and tertiary transformer windings for supplying output signals to a load circuit, a pair of diode rectifiers connected to rectify the alternating current voltage from the said thermionic tube, connections between the other secondary and tertiary winding terminals and the diode anodes to excite the anode elements of the diodes by equal and opposite voltages in phase and in phase opposition to the said cathode voltage available at the said tuned circuit, and means to supply the direct current output from the rectifiers in differential manner to the said load resistor.

4. A frequency modulation discriminator circuit including a thermionic amplifier tube having at least a cathode, a control electrode and an output electrode, means to supply frequency modulated signal input upon the control electrode input circuit of the said tube, a pair of tuned circuits, each tuned circuit including parallelly connected inductance and capacity elements connected to the cathode and the combination tuned to the center frequency of the frequency range of the frequency modulated signals applied upon the input circuit, a radio frequency transformer having its primary winding connected to the amplifier output electrode, said transformer having tightly coupled secondary and tertiary windings to receive voltages from the said primary winding, said transformer having its natural frequency outside and above the spectrum of the received frequency modulated signal input, a load resistor for supplying output signals to a load circuit, a pair of diode rectifiers connected to rectify the alternating current voltage from the said thermionic tube, means to excite the anode elements of the diodes by equal and opposite voltages in phase and in phase opposition to the said cathode voltage available at the said tuned circuit, and means to supply the direct current output from the rectifiers in differential manner to the said load resistor.

5. A frequency modulation discriminator circuit including a thermionic amplifier tube having at least a cathode, a control electrode and an output electrode, an input circuit connected to said control electrode, means to supply frequency modulated signal input upon the control electrode input circuit of the said tube, a tuned circuit comprising inductance and capacity elements connected to the cathode and included in said input circuit and tuned to the center frequency of the frequency range of the frequency modulated signals applied upon the input circuit, a radio frequency transformer having its primary winding connected to the amplifier output electrode, said transformer having tightly coupled secondary and tertiary windings to receive voltages from the said primary winding, said transformer having its natural frequency outside and above the spectrum of the received frequency modulated signal input, a load resistor in circuit with said secondary and tertiary windings and said cathode for supplying output signals to a load circuit, a pair of diode rectifiers connected to rectify the alternating current voltage from the said thermionic tube, a separate circuit including each of said secondary and tertiary windings and a respective diode rectifier thereby to excite the anode elements of the diodes by equal and opposite voltages in phase and in phase opposition to the cathode voltage available at the said tuned circuit, and means to supply the direct current output from the rectifiers in differential manner to the said load resistor.

6. A frequency modulation discriminator circuit including a thermionic amplifier tube having at least a cathode, a control electrode and an output electrode, an input circuit connected to said control electrode, means to supply frequency modulated signal input upon the control electrode input circuit of the said tube, means to apply biasing voltage upon the said control electrode, a tuned circuit connected to said cathode and included in said input circuit and tuned to the center frequency of the frequency range of the frequency modulated signals applied upon the input circuit, a radio frequency transformer having its primary winding connected to the amplifier output electrode, said transformer having tightly coupled secondary and tertiary windings to receive voltages from the said primary winding, said transformer having its natural frequency outside and above the spectrum of the received frequency modulated signal input, a load resistor in circuit with said secondary and tertiary windings and said cathode for supplying output signals to a load circuit, a pair of diode rectifiers connected to rectify the alternating current voltage from the said thermionic tube, a separate circuit including each of said secondary and tertiary windings and a respective diode rectifier thereby to excite the anode elements of the diodes by equal and opposite voltages in phase and in phase opposition to the cathode voltage available at the said tuned circuit, and means to supply the direct current output from the rectifiers in differential manner to the said load resistor.

7. A frequency modulation discriminator circuit including a thermionic amplifier tube having at least a cathode, a control electrode and an output electrode, an input circuit connected to said control electrode, means to supply frequency modulated signal input upon the control electrode input circuit of the tube, grid leak means to apply biasing voltage upon the said control electrode, a tuned circuit connected to the cathode and included in said input circuit and tuned to the center frequency of the frequency range of the frequency modulated signals applied upon the input circuit, a radio frequency transformer having its primary winding connected to the amplifier output electrode, said transformer having tightly coupled secondary and tertiary windings to receive voltages from the said primary winding, said transformer having its natural frequency outside and above the spectrum of the received frequency modulated signal input, a load resistor in circuit with said secondary and tertiary windings and said cathode for supplying output signals to a load circuit, a pair of diode rectifiers connected to rectify the alternating current voltage from the said thermionic tube, a separate circuit including each of said secondary and tertiary windings and a respective diode rectifier thereby to excite the anode elements of the diodes by equal and opposite voltages in phase and in phase opposition to the cathode voltage available at the said tuned circuit, and means to supply the direct current output from the rectifiers in differential manner to the said load resistor.

8. A frequency modulation discriminator circuit including a thermionic amplifier tube having at least a cathode, a control electrode and an output electrode, an input circuit connected to said control electrode, means to supply frequency modulated signal input upon the control electrode input circuit of the said tube, a tuned circuit connected to the cathode and included in said input circuit and tuned to the center frequency of the frequency range of the frequency modulated signals applied upon the input circuit, a radio frequency transformer having its primary winding connected to the amplifier output electrode, said transformer having tightly coupled secondary and tertiary windings to receive voltages from the said primary winding, said transformer having its natural frequency outside and above the spectrum of the received frequency modulated signal input, a load resistor in circuit with said secondary and tertiary windings and said cathode for supplying output signals to a load circuit, a capacity element connecting one terminal of the load resistor to a point of fixed potential, a resistor element to connect the cathode also to the point of fixed potential, a pair of diode rectifiers connected to rectify the alternating current voltage from the said thermionic tube, a separate circuit including each of said secondary and tertiary windings and a respective diode rectifier thereby to excite the anode elements of the diodes by equal and opposite voltages in phase and in phase opposition to the cathode voltage available at the said tuned circuit, and means to supply the direct current output from the rectifiers in differential manner to the said load resistor.

9. In a frequency discriminator circuit, a thermionic device having at least a cathode, a control electrode and an anode, a connection from the control electrode to a source of signal energy of a predetermined range of frequency variation, a tuned circuit including inductance and capacity elements connected between the cathode and a point of fixed potential, said circuit being tuned to the center frequency of the applied frequency range, a high impedance feeder resistor included in the cathode circuit between the cathode and the point of fixed potential, an aperiodic transformer having a primary winding connecting said anode and a source of positive voltage, a pair of transformer secondary windings to receive energy from the primary, said transformer having its natural frequency above said frequency range, a pair of diode rectifiers each having anode and cathode elements, a common connection between the cathode of the first named thermionic device and the cathode elements of the pair of diodes, a connection from one terminal of each secondary winding of the transformer to the diode anodes to supply balanced voltages to the diodes for rectification, an output resistor, a connection from the other end of each transformer secondary to the outer terminal of the output resistor, a connection from the end of the feeder resistor remote from the point of fixed potential to an intermediate point on the output resistor, means to connect one end of the said load resistor to an output circuit and capacity means to connect the other end of the load resistor to the point of fixed potential.

10. A frequency discriminator circuit including a thermionic device having at least a cathode, a control electrode and an anode, a connection from the control electrode to an input source of signal energy of a predetermined range of frequency variation, a tuned circuit including inductance and capacity elements connected between the cathode and a point of fixed potential, said circuit being tuned substantially to the center frequency of the input frequency range, a high impedance feeder resistor included in the cathode circuit between the cathode and a point of fixed potential, an aperiodic transformer having a primary winding connecting the tube anode and a source of positive voltage, a pair of transformer secondary windings to receive energy from the primary, said transformer having its natural frequency above said frequency range, a pair of diode rectifiers each having anode and cathode elements, a common connection between the cathode of the first named thermionic device and the diodes, connections from one terminal of each secondary winding of the transformer to the diode anodes to supply balanced voltages to the diodes for rectification, an output resistor, a connection from the other end of each transformer secondary to the outer terminal of the output resistor, a connection from the end of the feeder resistor remote from the point of fixed potential to a central point on the output resistor, and means to connect one end of the said load resistor to an output circuit.

11. A frequency discriminator circuit including electronic elements formed as an amplifying section which includes at least a cathode, a control electrode and an anode and as a double diode rectifying section which includes two anode elements and associated cathode sections with the cathode elements of the amplifying and rectifying sections being at like potential, means to supply frequency modulated signal energy to the control electrode, circuit connection means to connect the cathode to a point of fixed potential, said connection including a tuned circuit comprising inductance and capacity elements tuned to the center frequency of the supply and a high impedance feeder resistor, a transformer having a primary winding and a pair of reversely wound secondary windings to receive energy from the primary, said transformer having its natural frequency above the frequency range of said signal energy, said primary winding being connected at one end to the anode of the amplifying section of the electronic elements and at the other end to a source of positive voltage, an output resistor, a connection from one end of each secondary winding to one end terminal of the output resistor, a connection from the other end of each secondary winding to one anode element of the diodes to supply energy output from the amplifier section to the diodes, a connection from the end of the feeder resistor remote from the point of fixed potential to substantially a central point on the load resistor, and capacity means to connect the end terminals of the load resistor to a load circuit and to the point of fixed potential.

KURT SCHLESINGER.

REFERENCES CITED

The following references are of record in the file of this patent:

UNITED STATES PATENTS

| Number | Name | Date |
|---|---|---|
| 2,259,891 | Hunt | Oct. 21, 1941 |
| 2,266,517 | Rust et al. | Dec. 16, 1941 |
| 2,273,771 | Hunt | Feb. 17, 1942 |